United States Patent
Li

(10) Patent No.: US 8,804,869 B2
(45) Date of Patent: Aug. 12, 2014

(54) OFDM PAPR REDUCTION USING CANCELATION VECTORS

(75) Inventor: Yunxin Li, Vaucluse (AU)

(73) Assignee: Nitero Pty Limited, Fitzroy, Victoria (AU)

( * ) Notice: Subject to any disclaimer, the term of this patent is extended or adjusted under 35 U.S.C. 154(b) by 6 days.

(21) Appl. No.: 13/511,335

(22) PCT Filed: Nov. 23, 2010

(86) PCT No.: PCT/AU2010/001571
§ 371 (c)(1),
(2), (4) Date: Jun. 28, 2012

(87) PCT Pub. No.: WO2011/060509
PCT Pub. Date: May 26, 2011

(65) Prior Publication Data
US 2012/0257690 A1  Oct. 11, 2012

(30) Foreign Application Priority Data

Nov. 23, 2009 (AU) ................................. 2009905739

(51) Int. Cl.
*H04L 25/49* (2006.01)
*H04L 25/03* (2006.01)
*H04L 27/34* (2006.01)

(52) U.S. Cl.
CPC .. *H04L 27/3411* (2013.01); *H04B 2201/70706* (2013.01)
USPC ........... 375/296; 375/295; 375/285; 375/259; 375/297; 455/114.3; 455/114.2; 455/91; 708/300; 708/200

(58) Field of Classification Search
CPC ............ H04L 27/2614; H04L 27/2623; H04L 27/2624; H04L 27/2618; H04L 27/3411; H04L 27/368; H04L 25/03834; H04L 25/03859; H03F 2201/3236; H04B 2001/0416; H04B 2001/70706; H04W 52/325
USPC ................. 375/260, 259, 296, 295, 285, 297; 455/114.3, 114.2, 91; 708/300, 200
See application file for complete search history.

(56) References Cited

U.S. PATENT DOCUMENTS

| 8,175,179 B2 * | 5/2012 | Baliga et al. ................... 375/260 |
| 2003/0055610 A1 * | 3/2003 | Webber ........................ 702/194 |

(Continued)

FOREIGN PATENT DOCUMENTS

WO   WO 2008/036727   3/2008

OTHER PUBLICATIONS

Luqing Wang; Tellambura, C., "Analysis of Clipping Noise and Tone-Reservation Algorithms for Peak Reduction in OFDM Systems," Vehicular Technology, IEEE Transactions on , vol. 57, No. 3, pp. 1675,1694, May 2008.*

(Continued)

*Primary Examiner* — Chieh M Fan
*Assistant Examiner* — Michelle M Koeth
(74) *Attorney, Agent, or Firm* — Hickman Palermo Truong Becker Bingham Wong LLP; Edward A. Becker

(57) ABSTRACT

A Symbol vector for RF transmission after multiplexing onto a subset of a set of subcarriers using OFDM is transformed to the time domain. A first time domain cancellation vector is generated from a basis vector that has the same dimensionality as the symbol vector. In the frequency domain the basis vector has a substantially zero value in each of a first subset of sub-carriers of the symbol vector and in the time domain the difference between a first element of the basis vector having the highest value and a second element of the basis vector having the next highest value is maximized. The first cancellation vector is subtracted from the symbol vector to produce modified symbol vector having reduced Peak-to-Average Power Ratio (PAPR). A second cancellation vector is generated using the modified symbol vector and is used to produce a second modified symbol vector having reduced PAPR.

32 Claims, 11 Drawing Sheets

(56) References Cited

U.S. PATENT DOCUMENTS

| | | | |
|---|---|---|---|
| 2005/0033518 A1* | 2/2005 | Jenner | 702/14 |
| 2006/0078066 A1 | 4/2006 | Yun et al. | |
| 2006/0140296 A1* | 6/2006 | Cleveland et al. | 375/260 |
| 2007/0217329 A1 | 9/2007 | Abedi | |
| 2007/0230774 A1* | 10/2007 | Baqai | 382/162 |
| 2008/0002779 A1* | 1/2008 | Carsello | 375/260 |
| 2012/0014339 A1* | 1/2012 | Bitran et al. | 370/329 |

OTHER PUBLICATIONS

PCT International Search Report and Written Opinion, International Application No. PCT/AU2010/001571, filed Nov. 23, 2010, Australian Patent Office, Jan. 19, 2011, 8 pages.

* cited by examiner

OFDM PAPR REDUCTION USING CANCELATION VECTORS

CROSS-REFERENCE TO RELATED APPLICATION

The present application claims priority from Australian provisional patent application No. 2009905739 filed 23 Nov. 2009, the content of which is incorporated herein by reference.

TECHNICAL FIELD

This invention concerns Orthogonal Frequency Division Multiplexing (OFDM), and in particular a method for improving the noise performance of this multiplexing technique. In a second aspect the invention concerns software for performing the method. In a third aspect the invention concerns an RF transmitter for transmitting OFDM with improved noise performance characteristics. In a further aspect the invention is an OFDM signal with improved noise performance characteristics.

BACKGROUND ART

Orthogonal Frequency Division Multiplexing (OFDM) is the dominant multiplexing and modulation technique used in wireless communications. OFDM transmits multiple data streams by assigning each of them uniquely to one or more of a large number of sub-carriers where each sub-carrier operates at a unique carrier frequency (tone). The adjacent sub-carrier frequencies or tones have a fixed frequency difference between them. The data is carried in each sub-carrier by modulating its amplitude or phase, or both. For instance, phase shift keying (PSK) can be used to code the data into the phase of the subcarrier. An alternative form of modulation commonly used with OFDM is Quadrature Amplitude Modulation (QAM).

Quadrature Amplitude Modulation (QAM) codes a data signal comprising a series of symbols into two signals, respectively called the I-signal and the Q-signal. The I-signal and the Q-signal then modulate the amplitudes of two respective carriers that have the same frequency but whose phases differ by 90 degrees. For example, the I-signal carrier is presented by $\cos(2\pi ft)$ and the Q-signal carrier is represented by $\sin(2\pi ft)$. In the simplest form each symbol is coded either "1" or "0" (using one bit for each I-signal symbol without using the Q-signal). However it is more common for each symbol to be coded with more than two values; for instance 16QAM codes each symbol into one of sixteen values (using four bits). This is commonly represented by constellation diagram that uses the real axis I and imaginary axis Q to represent amplitude and phase; see FIG. 1.

In FIG. 1 the datum (0,0,0,0) is shown top left, and the datum (1,1,1,1) is shown bottom right. These corner signals have maximum amplitude, and they have the peak power as shown at 10. Whereas the average power is shown at circle 12. As a result this constellation has a peak-to-average power ratio (PAPR) equal to 2.5527 dB, which is the minimum PAPR for single-carrier (SC) modulation.

However, when OFDM is used to transmit many 16QAM symbols simultaneously it uses many subcarriers, for example 352 subcarriers, and in consequence the PAPR is increased. Without any PAPR reduction, the PAPR of a standard OFDM signal using 352 subcarriers and 16QAM could reach 28.0181 dB. In consequence, to completely eliminate distortion, the transmitter will occasionally be required to transmit 38.0181 dBm even though the required average power is only 10 dBm.

In this example of OFDM with 16QAM, out of the 512 tones only 352 tones are used for data and pilot 20, and 160 tones are unused. Normally 157 of the unused tones are located at the two ends of the channel bandwidth 22, and 3 of the unused tones are located around the centre of the channel bandwidth 24; see FIG. 2.

In conclusion, while OFDM has many advantages, it does generally suffer from a high peak-to-average power ratio (PAPR) compared to the conventional single carrier (SC) modulation. The peak power of an OFDM signal can be much higher than its average power; in other words, an OFDM signal can have a very large dynamic range. When a signal with high PAPR is used for communication, it will have the following three disadvantages:

1. To meet the peak power requirement, the transmitter (TX) maximum output power has to be high, resulting in high power and high cost.
2. All circuits, and especially the power amplifiers (PA), exhibit more non-linearity to a signal with higher PAPR. The nonlinearity causes the signal to spill into adjacent channels, resulting in Adjacent Channel Interference (ACI). In addition, the nonlinearity causes in-band distortion, resulting in performance loss or higher error rate.
3. A higher PAPR signal requires more bits per sample for digital processing. For example, the number of bits in the transmitter's digital-to-analogue converter (DAC) has to be increased to accommodate the larger dynamic range. This is another factor for power and cost increase.

Overall, high PAPR implies large size, high cost, high power and low performance.

Intuitively the PAPR problem can be tackled by improving the analogue circuitry to achieve greater linearity, higher power operation and wider dynamic range. However in practice, this approach has proved expensive and unreliable, since it is difficult to accurately control the parameters of an analogue circuit.

DISCLOSURE OF THE INVENTION

In one aspect, the invention is a method for improving noise performance in a Radio Frequency (RF) transmitter that makes use of Orthogonal Frequency Division Multiplexing (OFDM); the method comprising the steps of:

Receiving a stream of digital data symbols in the form of symbol vectors, for RF transmission after multiplexing onto a subset of a set of sub-carriers according to OFDM.

Transforming each received symbol vector to the time domain.

Generating a first time domain cancellation vector from a received basis vector that has the same dimensionality as the symbol vectors, wherein in the frequency domain the basis vector has substantially zero value in each of the subset of sub-carriers of the symbol vector. And wherein in the time domain the difference between a first element of the basis vector having the highest value and a second element of the basis vector having the next highest value is maximised.

Processing each symbol vector by subtracting the first cancellation vector from it to produce a modified symbol vector having reduced Peak-to-Average Power Ratio (PAPR).

Then iteratively generating a new cancellation vector using the modified symbol vector, and producing a new symbol vector having reduced Peak-to-Average Power Ratio (PAPR).

This method provides a digital time domain technique, that can be used in a transmitter that makes use of OFDM, to significantly reduce the PAPR of the transmitted signals. In essence the method modifies the transmitted symbols to improve PAPR; and with high probabilities the reduced PAPR could be less than 7 dB, rather than 12 dB. The method employs a low complexity real-time computation that leads to lower power consumption and lower cost in the transmitter.

Since the basis vector maximises the difference between the first element having the highest value and the second element having the next highest value, the basis vector is much less likely to accidentally increase the peak power. As a result, fewer iterations are required for the cancellation vector to converge.

The difference may be calculated as a subtraction between the first element and the second element. Alternatively, the difference may be calculated as a ratio between the first element and the second element.

The difference between the first element and the second element may be maximised using an iterative process that is performed for a predetermined number of iterations or until the difference cannot be improved further.

In the frequency domain the basis vector may have non-zero value in each of a second subset of virtual sub-carriers. In this case, it is a further advantage of the method that spectrum usage efficiency is improved because virtual or guard sub-carriers are used as reserved sub-carriers. This is to be contrasted with methods where data sub-carriers that could otherwise be used for data transmission are reserved for PAPR reduction.

The non-zero value of the virtual sub-carriers in the frequency domain may gradually decrease as the virtual sub-carriers are closer to ends of an OFDM channel comprised of the set of sub-carriers.

Generation of the first instance of the cancellation vector may involve, for each element of the symbol vector that has power greater than a chosen threshold, multiplying the value of that element of the symbol vector by the vector of an offset of the basis vector to produce a product. For instance, where the $n^{th}$ element of the symbol vector exceeds the threshold it is multiplied by the (n−1) element off-settled basis vector.

Then, after all the qualifying elements of the symbol vector have been multiplied in this way, all the products may be summed.

Then the sum may be multiplied by a scaling factor between zero and one to generate the first instance of the cancellation vector.

The first instance of the cancellation vector may then be subtracted from the symbol vector to produce a modified symbol vector.

In the next iteration the modified symbol vector is used to generate a second instance of the cancellation vector.

Thereafter in each successive iteration the next instance of the symbol vector is produced from the current cancellation vector, and the next instance of the cancellation vector is generated from the current symbol vector.

This calculation may be performed for instance by cyclically shifting the basis vector to the right to align it appropriately with the new symbol vector before the multiplications take place.

The iteration may continue for a predetermined number of cycles or until a threshold PAPR has been reached. Where a given number of iterations is used, early termination of the iterative process may be possible if peak power has been reduced below a target value. In general the number of necessary iterations will be dependent upon the basis vector selected.

Following PAPR improvement a Cyclic prefix (CP) may be added to each of the modified symbol vectors. Then the result may be converted to an analogue baseband signal, for instance using a digital-to-analogue converter (DAC). The resulting signal stream is then multiplexed according to OFDM prior to transmission via an antenna.

A number of variations are possible to the method:

For instance the transformation of each data symbol to the time domain is commonly done using the Fast Fourier Transform (FFT) but other means could also be employed. There are many variations available in the complexity of transforms from the frequency domain to the time domain.

The centre tones (or DC tones) may or may not be used for peak power reduction, depending whether the interface between the Digital to Analogue Converter (DAC) and the rest of the analogue circuits allows DC frequency to pass.

The basis vector, is typically prepared during, pre-processing and the values are generally selected in the frequency domain to ensure all values at the frequencies of the sub-carriers used to transmit data and pilot signals are not used. Then the basis vector is realized by transformation to the time domain.

The maximum value of the basis vector is better set to 1, but all the other samples can be real or complex.

The basis vector may be real, and apply peak reduction independently on the I-channel vector and Q-channel vector.

In one or more embodiments, the method has the advantage that there is no distortion to the transmitted data (and any pilot tones) so that there is no extra error rate performance loss, and uses the unused tones for PAPR reduction so that there is no data rate loss.

The parameters of the OFDM system, such as the total number of subcarriers, the number of data and pilot subcarriers, the number of unused (virtual) subcarriers can be many and varied.

By applying this method to a current RF transmitter using four antennas, it has been possible to deliver more average power than an eight antenna system. The number of transmitter antennas and associated circuits may therefore be reduced using the invention, for instance by half or more.

This invention does not require any modification in the receiver (RX) side. As a result use of the invention helps to improve receiver performance since the received signal exhibits a much smaller dynamic range, for instance by improving the quantization noise in the receiver, the Analogue to Digital Converter (ADC) and the accuracy of the receiver's Automatic Gain Control (AGC).

In a second aspect the invention is software for performing the method according to the first aspect.

In a third aspect the invention is an RF transmitter for transmitting OFDM with, improved noise performance characteristics. The transmitter will have an additional processing module to receive the basis vector, generate cancellation vectors and process received modulated symbols in the time domain to reduce their PAPR, wherein in the frequency domain the basis vector has substantially zero value in each of a subset of sub-carriers of the symbol vector and wherein in the time domain the difference between a first element of the basis vector having the highest value and a second element of the basis vector having the next highest value is maximised.

In a further aspect the invention is an OFDM signal produced by the method with improved noise performance characteristics.

BRIEF DESCRIPTION OF THE DRAWINGS

The background art has been described with reference to the following drawings, in which.

Figure 3:
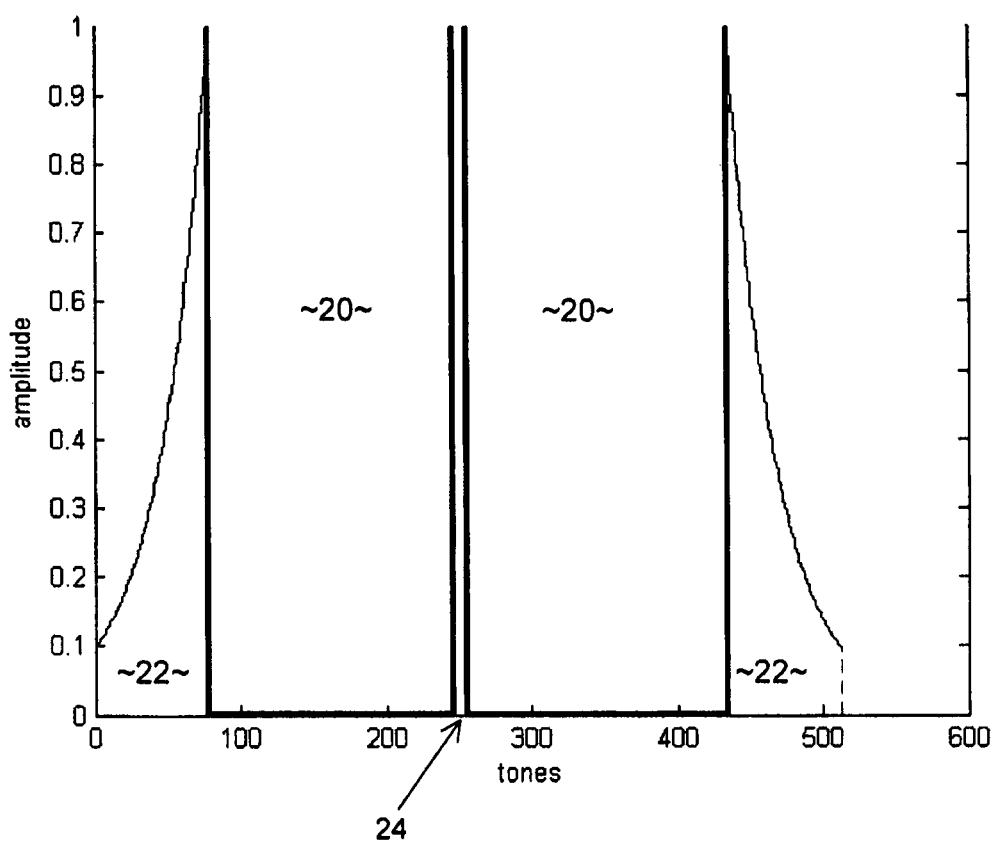

An example of the method will now be described with reference to the accompanying drawings, in which:

FIG. 3 is a spectrum diagram showing frequency band usage by an example of a basis vector.

Figure 4A:
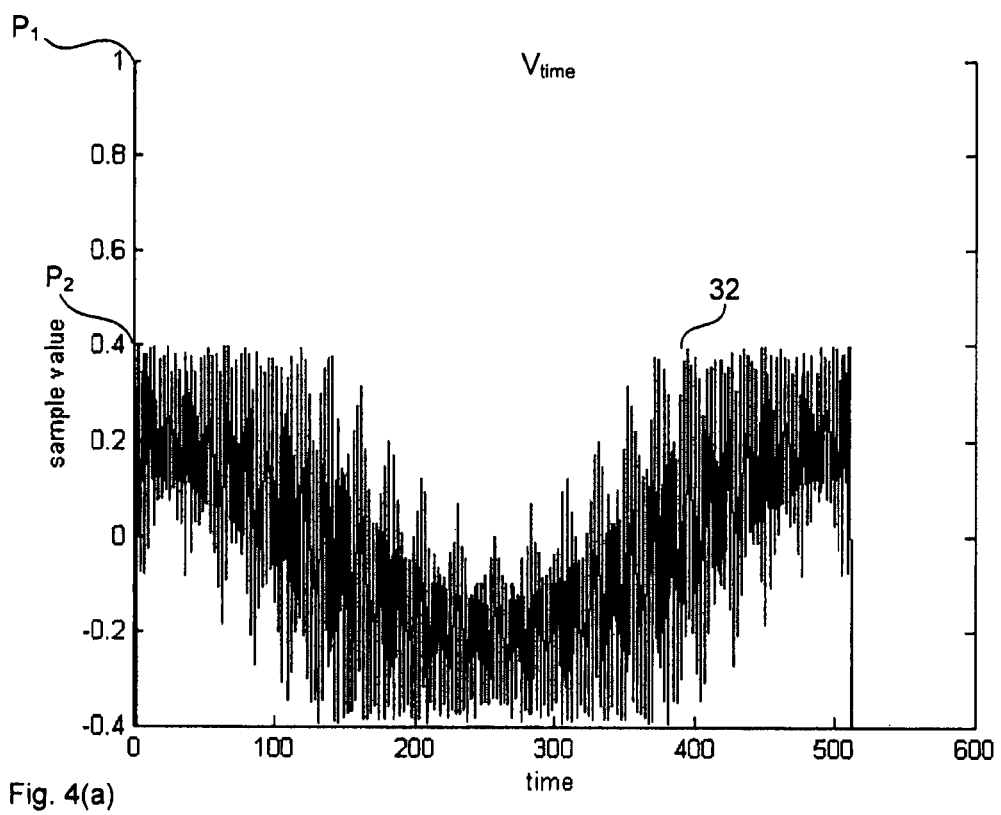

FIG. 4(a) is a time domain representation of the basis vector $V_{time}$ generated by one example of pre-processing.

Figure 4B:
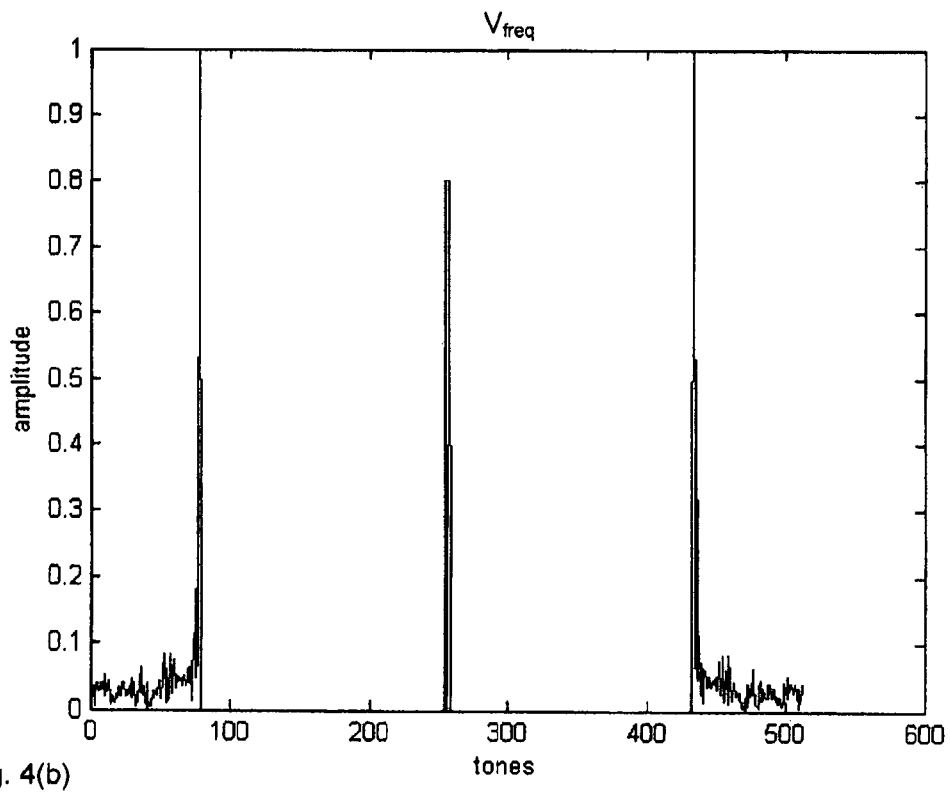

FIG. 4(b) is the frequency domain precursor to the basis vector $V_{time}$ of FIG. 4(a).

Figure 5:
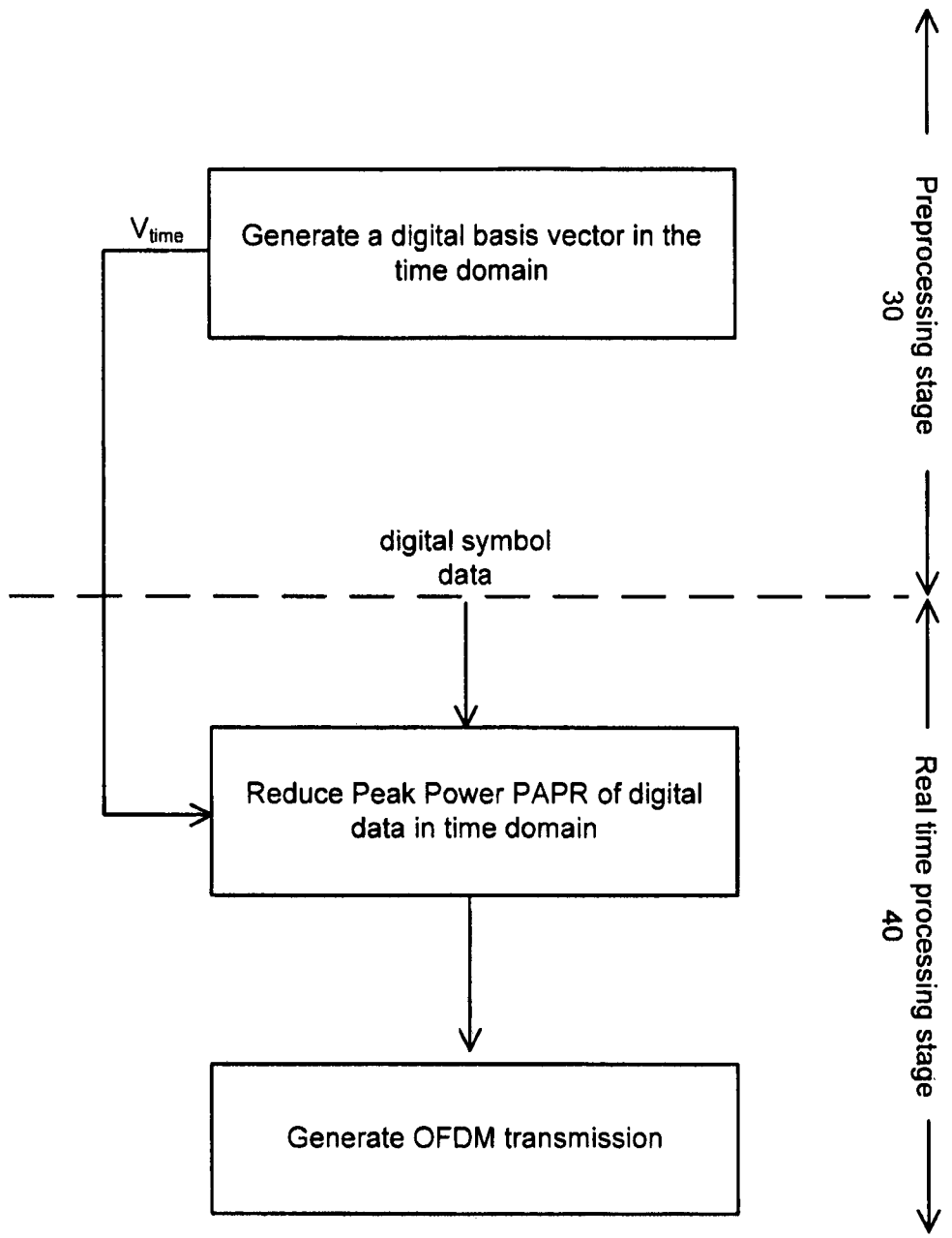

FIG. 5 is a flowchart showing an optional pre-processing part and the real-time processing of the method.

Figure 6:
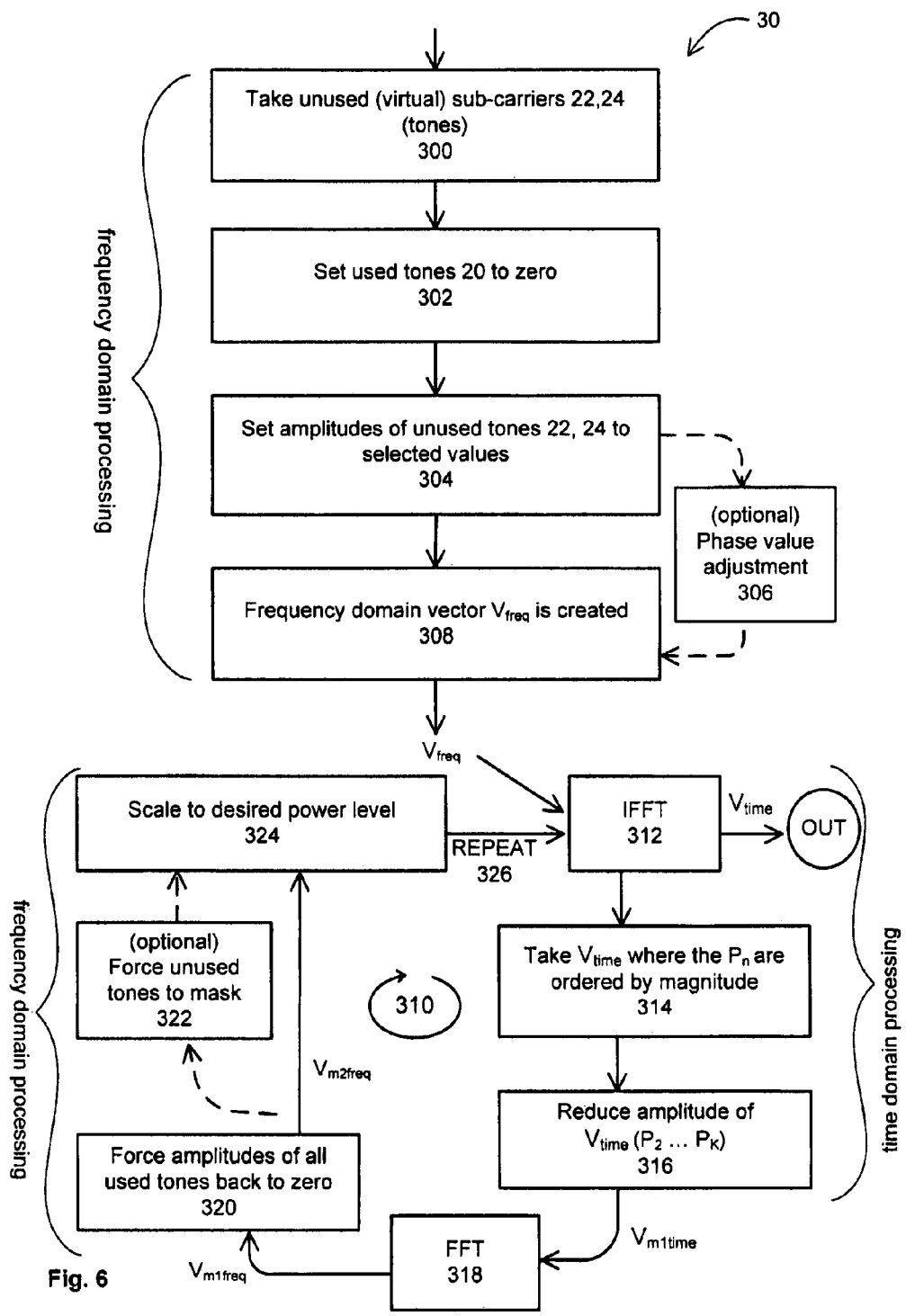

FIG. 6 is a detailed flowchart of the optional pre-processing part of the method.

Figure 7:
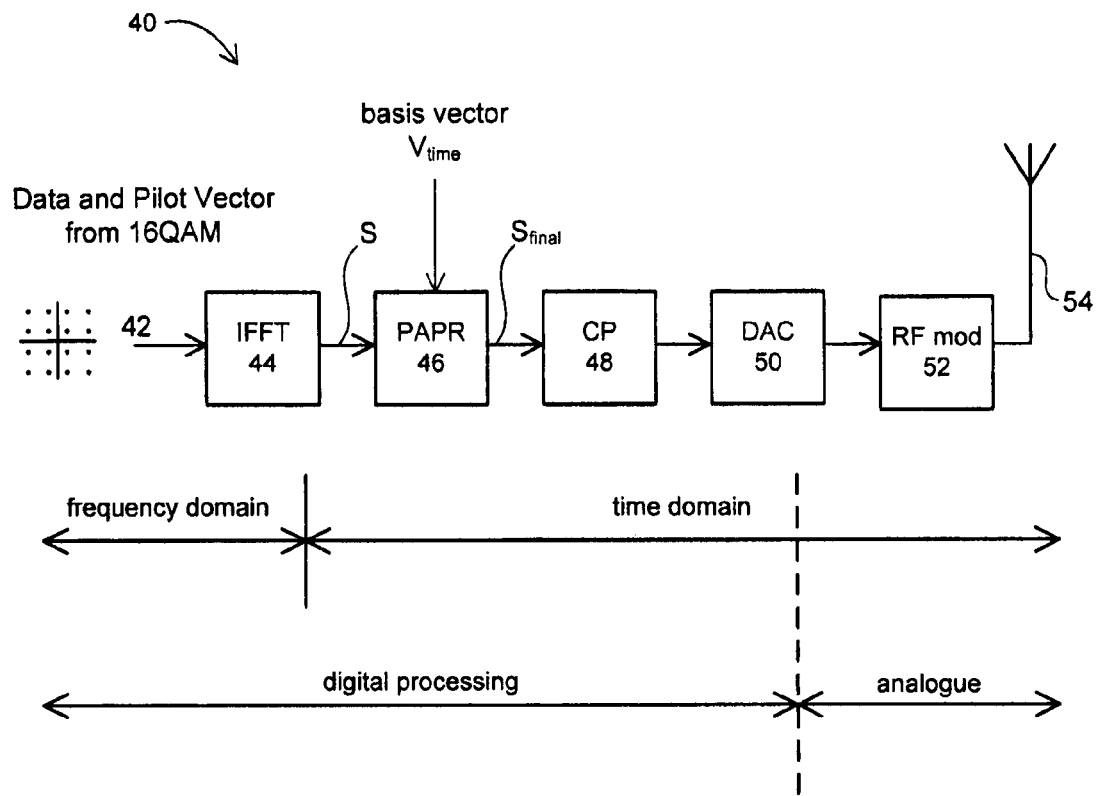

FIG. 7 is a block diagram of a transmitter incorporating the method.

Figure 8:
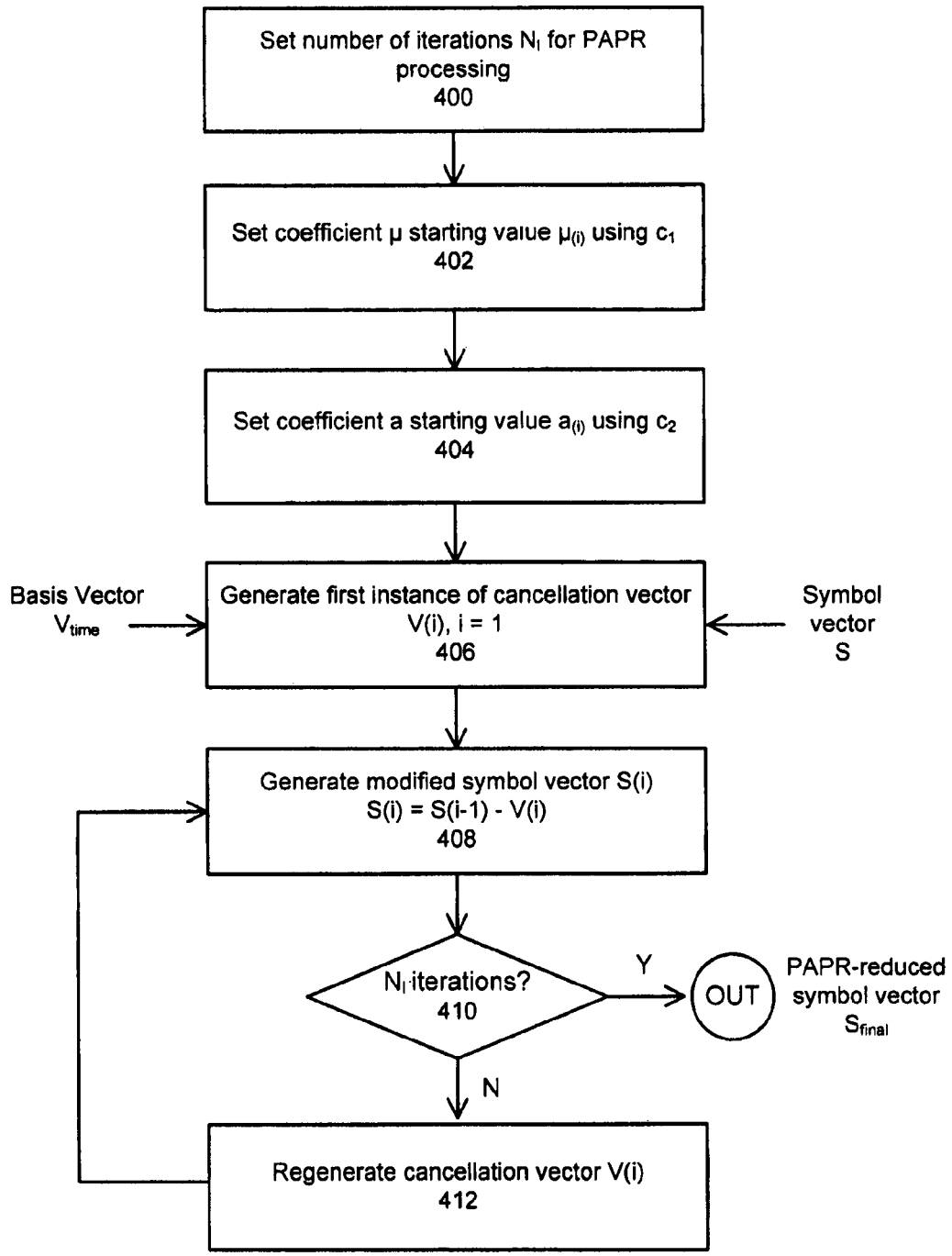

FIG. 8 is a detailed flowchart of the real-time processing undertaken in the transmitter of FIG. 7 to reduce PAPR.

Figure 9:
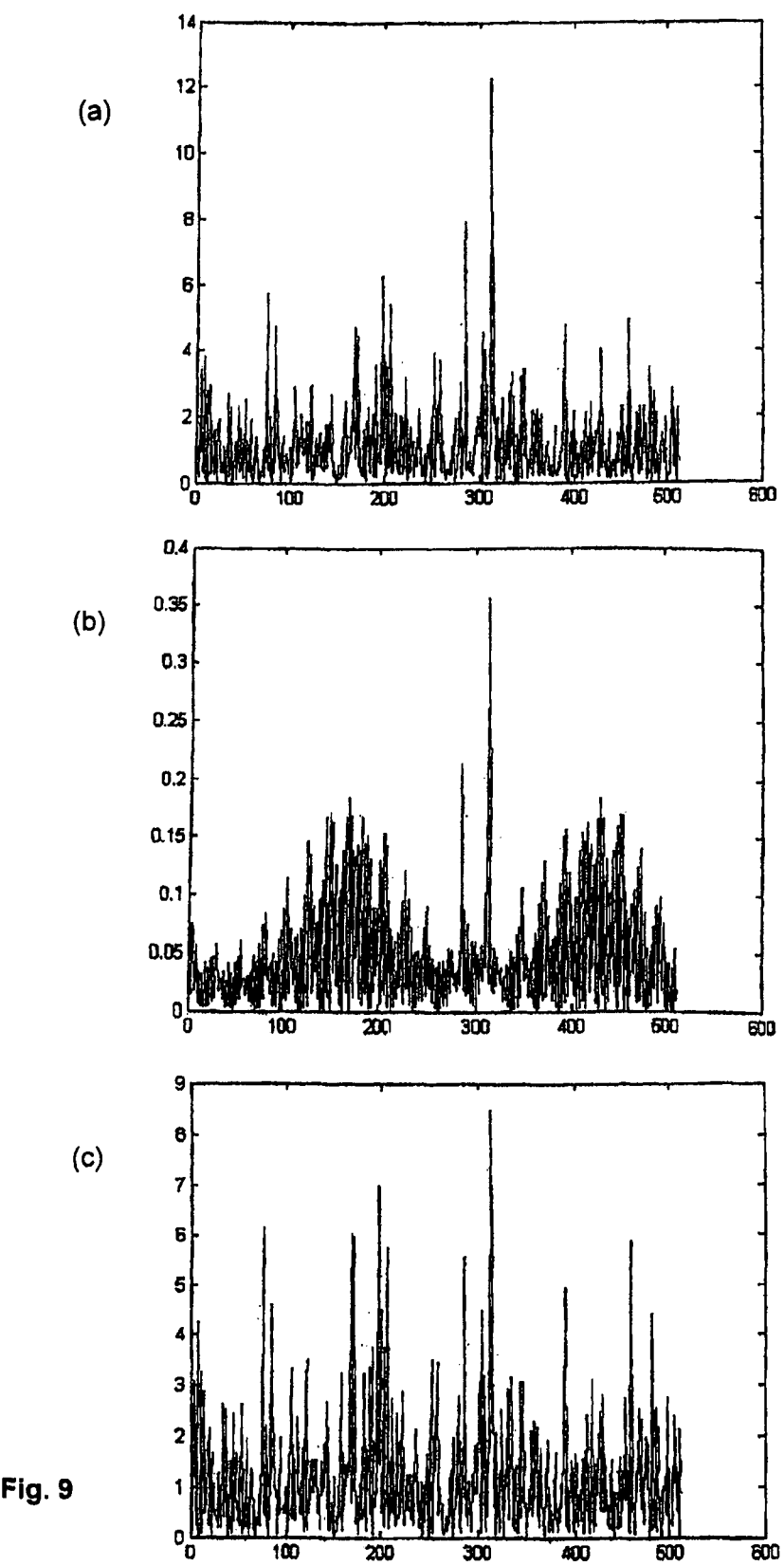
Figure 10:
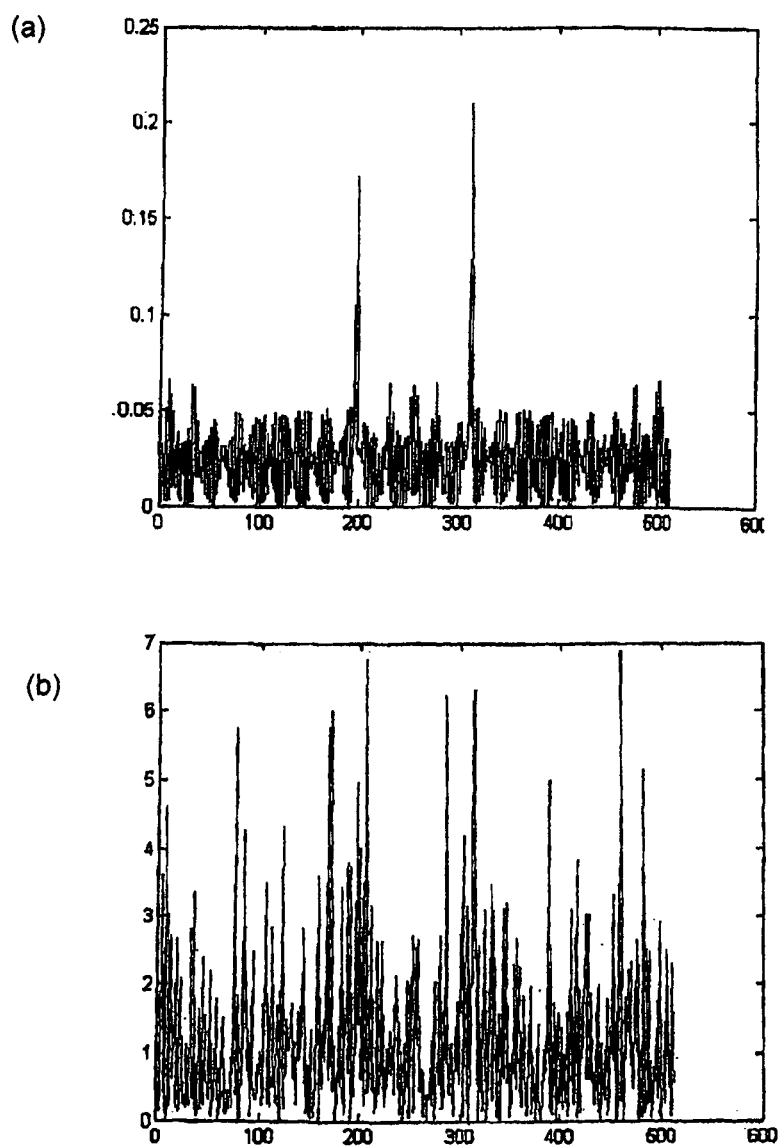

FIG. 9 and FIG. 10 is a series of graphs that illustrate the real-time processing according to FIG. 8:

FIG. 9(a) is a graph of the power (square of the amplitude) of a time domain symbol vector.

FIG. 9(b) is a graph of the power (square of the amplitude) of a first instance of a time domain cancellation vector.

FIG. 9(c) is a graph of the power (square of the amplitude) of a modified time domain symbol vector after subtraction of the cancellation vector of FIG. 9(b), with improved PAPR compared to FIG. 9(a).

FIG. 10(a) is a graph of the power (square of the amplitude) of a second instance of a time domain cancellation vector.

FIG. 10(b) is a graph of the power (square of the amplitude) of a further modified time domain symbol vector with further improved PAPR compared to FIG. 9(c).

Figure 11:
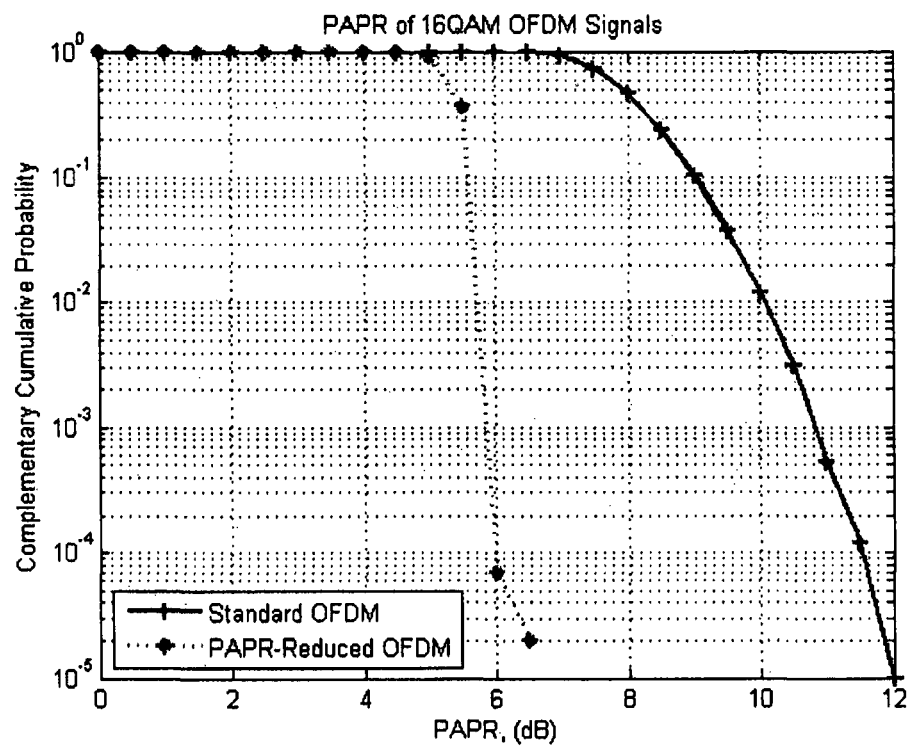

FIG. 11 is a graph showing improvement in PAPR using the method.

BEST MODES OF THE INVENTION

Figure 1:
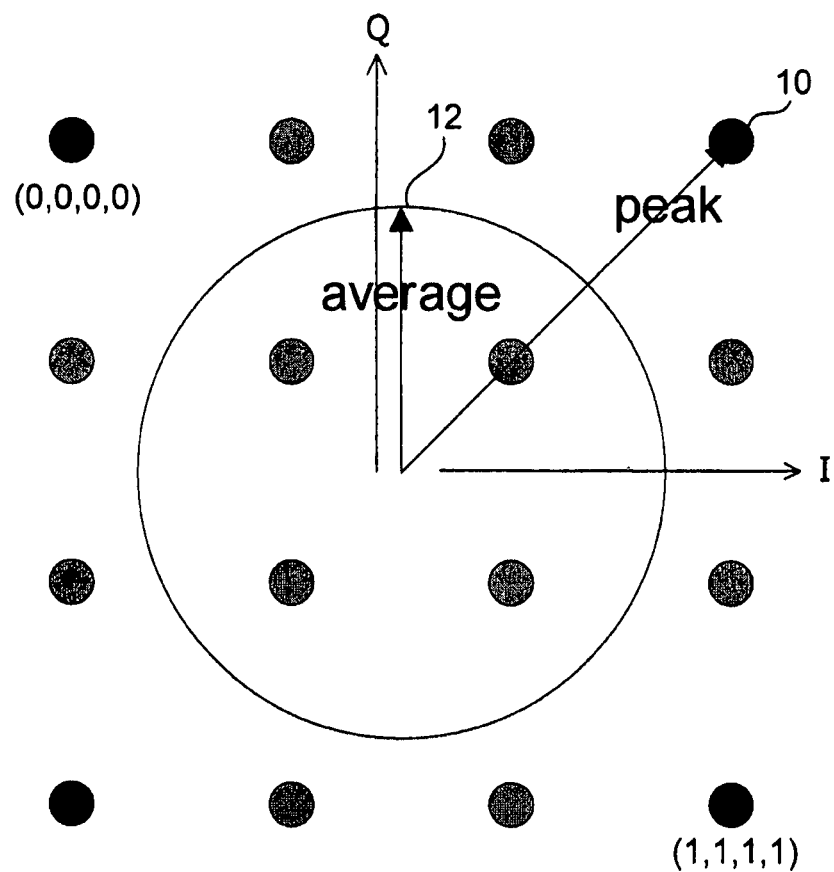
FIG. 1 is the constellation diagram for quadrature amplitude modulation using 16 symbols (16QAM).
Figure 2:
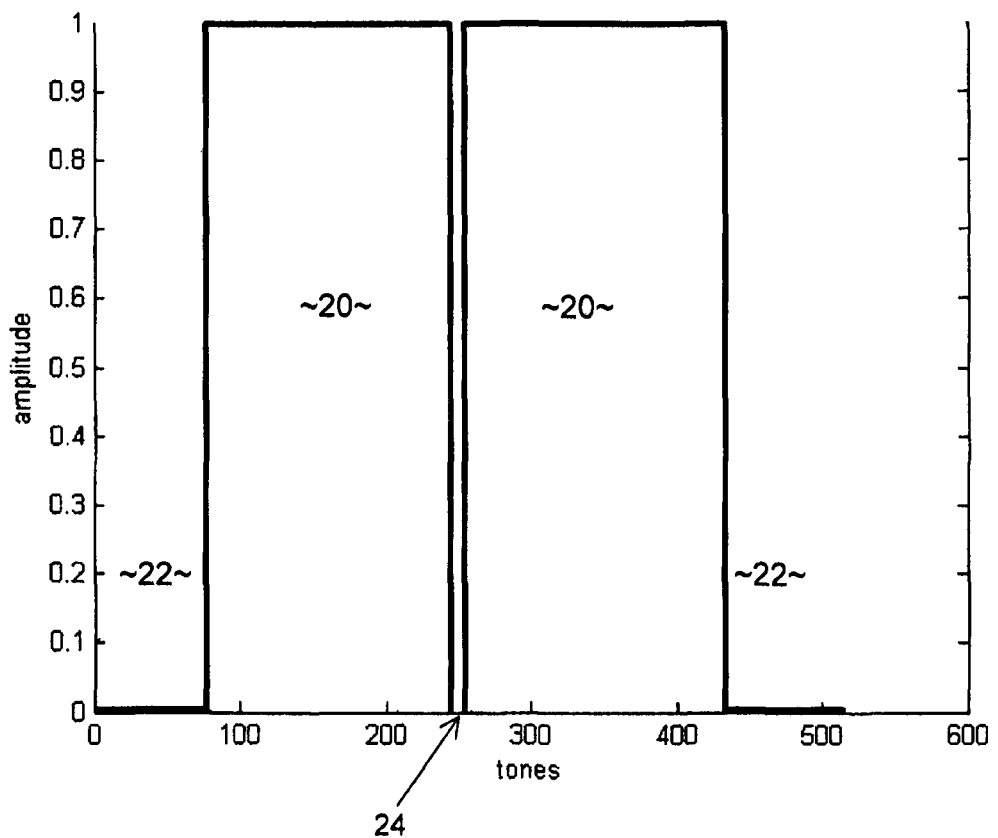
FIG. 2 is a spectrum diagram showing sub-carrier usage in typical OFDM transmissions.

Orthogonal Frequency Division Multiplexing (OFDM) generally transmits data symbols and pilot data (that monitors channel noise) using two frequency sub-bands, such as bands 20 shown in FIG. 2. This peak-to-average power ratio (PAPR) reduction method makes use of the vacant subcarriers 22, 24 of OFDM that have zero amplitude in the frequency spectrum, since this will avoid any interference with the transmitted data.

Values are inserted at some or all of the vacant (virtual) tones 22, 24 in the frequency domain, for instance according to the envelope seen in FIG. 3. The value of the vacant tones gradually decreases as the tones are closer to the ends of the channel. The values are selected such that the corresponding time domain vector (called the basis vector $V_{time}$) can be used to improve the PAPR of the modulated data in the time domain.

In particular the inserted values are selected to maximize the difference between the time domain sample of the basis vector $V_{time}$ having the highest power and the time domain sample having the next highest power. For example, in FIG. 4(a) the first time domain sample $P_1$, which has maximum amplitude, has been forced to '1'. And, the second time domain sample $P_2$ has been forced to '0.4'. How this is done will be explained below.

The Process for Improving Peak-to-Average Power Ratio (PAPR) Consists of Two Parts; See FIG. 5 for an Overview:

First, a pre-processing stage 30 required at design stage to create a digital basis vector $V_{time}$ in the time domain. The pre-processing is not implemented in the transmitter chip. The basis vector created in the pre-processing is used in the chip.

Second, a real-time processing stage 40 that uses the digital basis vector $V_{time}$ to reduce the peak power (PAPR) symbol-by-symbol immediately before the modulated digital data is multiplexed.

The Pre-Processing Stage 30; See FIG. 6:

First, in the frequency domain the tones that are not used for data and pilot in the OFDM transmission are found 300.

Next, the value of all the used tones 20 are set to zero 302.

Then, the amplitudes of the not used tones 22, 24 are selected 304. FIG. 3 shows one example of an envelope for the amplitudes that can be selected; here the sub-carriers at the boundaries of the channel 22 are reduced by 20 dB.

The phase values of the unused tones can be randomly set, or simply set to zero 306.

Following step 304, the result is described by a frequency domain vector $V_{freq}$ having 512 elements; note that the number of elements in $V_{freq}$ is normally a power of 2, such as 128, 256, 512 and 1024 etc.

Then the following process loop 310 is repeated:

Transform the frequency domain vector $V_{freq}$ to obtain a time-domain vector $V_{time}$ 312; for instance using the inverse fast Fourier transform (IFFT) on the frequency domain vector $V_{freq}$.

Select the k highest amplitude elements ($P_1$ to $P_k$) of the time-domain vector and omit the first (highest) 314 to leave elements ($P_2$ to $P_k$). For instance, by ordering the elements of the time-domain vector by the magnitude of their amplitudes and then taking the first k–1 values after the highest amplitude.

Reduce the amplitudes of the elements having the $k^{th}$ highest amplitude, except for the first (highest), ie ($P_2$ to $P_k$), without changing their phases 316. The reduction can be achieved, for example, by multiplying by a positive number less than one. All other elements of the modified time domain vector $Vm1_{time}$ are left unchanged.

Transform the modified time-domain vector $Vm1_{time}$ back to the frequency domain 318 to obtain a modified frequency domain vector $Vm1_{freq}$; for instance using the fast fourier transform FFT.

Force all elements in the used tones to substantially zero, i.e. zero or optionally a very small number without changing their phases 320. For example, a suitable very small number may be 20 dB below the signal level.

Optionally force the elements in the unused tones within the required spectrum mask 322.

Scale the modified vector $Vm2_{freq}$ to the desired power level again 324.

Repeat steps 312 to 324 until the difference of the amplitudes of elements is maximized 326 after many iterations and/or further improvements cannot be obtained; where $P_1$ is the maximum amplitude element and $P_2$ is the 2nd maximum amplitude element of the elements of the (many times modified) time-domain vector $Vmn_{time}$. The difference may be calculated as a ratio (i.e. $P_1/P_2$) between the elements. Alternatively, the difference may be calculated as a subtraction (i.e. $P_1-P_2$) between the elements.

Once the iteration is concluded the process loop outputs the resulting time domain vector $V_{time}$. The resulting time domain vector $V_{time}$ is called the 'basis vector', and this vector will have zero effect on the used tones 20 during the real-time processing stage 40, since it has zero value in the frequencies of all those sub-carriers.

An example of the resulting amplitudes of the basis vector $V_{time}$ is shown in FIG. 4(*a*). In this example the amplitude of $P_1$ has been maximised to an amplitude of '1', and the amplitudes of $P_2$ to $P_{512}$ have been reduced until no further practical reduction is possible. In this case it can be seen that $P_2$ is 8 dB below $P_1$.

FIG. 4(*b*) shows how the basis vector $V_{time}$ would look before conversion from the frequency domain $V_{freq}$. Here it can be seen that there are few amplitude peaks which eases the burden for downstream analogue filtering stages and minimizes spectral re-growth.

Real-Time Processing Stage 40; see FIGS. 7, 8, 9, 10 and 11

The architecture of a transmitter using the invention is shown in FIG. 7. In this example the digital symbols representing the data and pilot vectors 42 are received from the 16QAM modulator, and are each transformed by the IFFT 44 to a time domain vector in the general form of S where:

$$S = [s_1, s_2, \ldots s_{512}] = [|s_1|e^{j\theta_1}, |s_2|e^{j\theta_2}, \ldots |s_{512}|e^{j\theta_{512}}].$$

Note that S has the same dimensionality (512 in this example) as the basis vector $V_{time}$. In the time domain the PAPR improvement module 46 receives both the first symbol vector S and the basis vector $V_{time}$ which it uses to generate a series of cancellation vectors V(i) that are used to reduce the peak power in the first symbol vector S without introducing any distortion to the data and pilot tones.

In particular the basis vector $V_{time}$ is used to generate a first instance V(1) of cancellation vector V(i).

The first instance V(1) see FIG. 9(*b*), of the cancellation vector is then subtracted from the symbol vector S see FIG. 9(*a*) to result in modified symbol vector S(1) see FIG. 9(*c*), having improved PAPR.

Then, the cancellation vector is regenerated to produce a second instance V(2) see FIG. 10(*a*) which is subtracted from S(1) see FIG. 9(*c*) to generate S(2) see FIG. 10(*b*) having further improved PAPR. And this process continues until the desired number of iterations have been completed. The number of iterations is selected according to the PAPR required.

Generation of the first instance V(1) of cancellation vector V(i) involves:

For each element n (having value $s_n$) of the symbol vector S that has power $|s_n|^2$ greater than threshold a(1), the value of that element of the symbol vector is multiplied by the vector of the (n−1) element off-settled basis vector $V_{time}$ that is vector $V_{time}$(n−1) to produce a product.

After all the qualifying elements of the symbol vector have been multiplied in this way, all the products are summed.

The sum is then multiplied by factor μ(i) less than 1 to generate V(1).

V(1) is then subtracted from S to produce modified S(1), as described above. In the next iteration S(1) is used to generate V(2). Thereafter in each successive iteration the next instance of the symbol vector is produced from the current cancellation vector, and the next instance of the cancellation vector is generated from the current symbol vector and so on until $S_{final}$ is produced.

With reference to FIG. 8, the algorithm can be expressed mathematically as follows:

Initialize by setting:

the number of iterations $N_I$ - see 400,    (1)

coefficient $\mu(i)$ where $0 < \mu(i) < 1$, and coefficient $a(i)$ where $0 < a(i)$.

then for $i = 1$ to $N_I$ - see 410

$\mu(i) = c_1 \mu(i-1)$ - see 402

$a(i) = c_2 a(i-1)$ - see 404

$V(i) = \mu(i) \sum_{|s_n|^2 > a(i)} [s_n V_{time}(n-1)]$ - see 406 and 412

$S(i) = S(i-1) - V(i)$ - see 408

End where:

$c_1$ is a constant (0<$c_1$<1) selected to reduce μ(i) at iteration i, and $c_2$ is a constant (0<$c_2$<1) selected to reduce a(i) at iteration i.

This calculation of equation (1) may be performed for instance by cyclically shifting the basis vector to the right before to align it appropriately with the new symbol vector before the multiplications take place.

The PAPR improvement module 46 is the only modification introduced to an otherwise standard OFDM transmitting scheme.

Now referring back to FIG. 7, following PAPR improvement 46 a Cyclic prefix (CP) is added to the final instance of the PAPR-reduced vector $S_{final}$ by CP module 48, which is then converted to analogue baseband signal by the digital-to-analogue converter (DAC) 50 before being modulated by the RF modulator 52 prior to transmission by antenna 54.

FIG. 11 shows the complementary cumulative probability before and after applying PAPR reduction. It shows that the peak has been reduced by almost 6 dB.

Although the invention has been described with reference to a particular example it will be appreciated that many modifications and variations are possible within the inventive concept. For instance the invention is not tied to a particular basis vector and many different vectors are expected to prove useful in reducing PAPR.

The invention claimed is:

1. A method for improving noise performance in a Radio Frequency (RF) transmitter that makes use of Orthogonal Frequency Division Multiplexing (OFDM), the method comprising:

receiving a stream of digital data symbols in the form of a plurality of symbol vectors, for RF transmission after multiplexing onto a first subset of a set of sub-carriers according to OFDM;

transforming each symbol vector from the plurality of symbol vectors to the time domain; and for each symbol vector from the plurality of symbol vectors:

generating a first time domain cancelation vector from a basis vector that has the same dimensionality as the symbol vector, wherein in the frequency domain the basis vector has substantially zero value in each of the first subset of the set of sub-carriers and wherein in the time domain the difference between a first element of the basis vector having the highest value and a second element of the basis vector having the next highest value is maximized using an iterative process that is performed for a specified number of iterations or until the difference between the first element of the basis vector having the highest value and the second element of the basis vector having the next highest value cannot be further improved, generating a first modified symbol vector having reduced Peak-to-Average Power Ratio (PAPR) by subtracting the first time domain cancelation vector from the symbol vector, generating a second time domain cancelation vector using the first modified symbol vector, and generating a second modified symbol vector having a reduced PAPR by subtracting the second time domain cancelation vector from the first modified symbol vector.

2. The method as recited in claim 1, wherein in the frequency domain the basis vector has a non-zero value in each of a second subset of the set of sub-carriers.

3. The method as recited in claim 2, wherein the non-zero value in each of the second subset of the set of sub-carriers in the frequency domain gradually decreases as the second subset of the set of sub-carriers are closer to ends of an OFDM channel comprised of the set of sub-carriers.

4. The method as recited in claim 1, wherein the difference between the first element of the basis vector having the highest value and the second element of the basis vector having the next highest value is calculated as a subtraction between the first element of the basis vector having the highest value and the second element having the next highest value.

5. The method as recited in claim 1, wherein the difference between the first element of the basis vector having the highest value and the second element of the basis vector having the next highest value is calculated as a ratio between the first element of the basis vector having the highest value and the second element having the next highest value.

6. The method as recited in claim 1, wherein a determination that the difference between the first element of the basis vector having the highest value and the second element having the next highest value cannot be further improved is made based upon whether the difference satisfies a threshold.

7. The method as recited in claim 1, wherein generating the first time domain cancelation vector includes, for each element of the symbol vector that has a power greater than a threshold, multiplying the value of that element of the symbol vector by the vector of an offset of the basis vector to produce a product.

8. The method as recited in claim 7, wherein, after all the elements of the symbol vector that have the power greater than the threshold have been multiplied, summing all the products to generate a sum.

9. The method as recited in claim 8, wherein the sum is multiplied by a scaling factor between zero and one to generate the first time domain cancelation vector.

10. The method as recited in claim 7, wherein the multiplying is performed by cyclically shifting the basis vector to the right to align it appropriately with the symbol vector before the multiplications are performed.

11. The method as recited in claim 1, wherein thereafter in each of one or more successive iterations, a next instance of the first or second modified symbol vector is produced from the first or second time domain cancelation vector, and a next instance of the time domain cancelation vector is generated from the first or second modified symbol vector.

12. The method as recited in claim 11, wherein the one or more successive iterations continue for a specified number of cycles or until a threshold PAPR has been reached.

13. The method as recited in claim 12, wherein following PAPR improvement a Cyclic prefix (CP) is added to each of the first or second modified symbol vectors.

14. The method as recited in claim 1, wherein the basis vector is prepared during pre-processing and the values for the basis vector are selected in the frequency domain to ensure all values at the frequencies of the set of sub-carriers used to transmit data and pilot signals are not used, then the basis vector is realized by transformation to the time domain.

15. The method as recited in claim 14, wherein a maximum value of the basis vector is 1.

16. The method as recited in claim 14, wherein the basis vector is real, and peak reduction is applied independently on an I-channel vector and a Q-channel vector.

17. A Radio Frequency (RF) transmitter that makes use of Orthogonal Frequency Division Multiplexing (OFDM), the RF transmitter comprising a processing module configured to perform:

receiving a stream of digital data symbols in the form of a plurality of symbol vectors, for RF transmission after multiplexing onto a first subset of a set of sub-carriers according to OFDM;

transforming each symbol vector from the plurality of symbol vectors to the time domain; and for each symbol vector from the plurality of symbol vectors:

generating a first time domain cancelation vector from a basis vector that has the same dimensionality as the symbol vector, wherein in the frequency domain the basis vector has substantially zero value in each of the first subset of the set of sub-carriers and wherein in the time domain the difference between a first element of the basis vector having the highest value and a second element of the basis vector having the next highest value is maximized using an iterative process that is performed for a specified number of iterations or until the difference between the first element of the basis vector having the highest value and the second element of the basis vector having the next highest value cannot be further improved, generating a first modified symbol vector having reduced Peak-to-Average Power Ratio (PAPR) by subtracting the first time domain cancelation vector from the symbol vector, generating a second time domain cancelation vector using the first modified symbol vector, and generating a second modified symbol vector having a reduced PAPR by subtracting the second time domain cancelation vector from the first modified symbol vector.

18. The RF transmitter as recited in claim 17, wherein in the frequency domain the basis vector has a non-zero value in each of a second subset of the set of sub-carriers.

19. The RF transmitter as recited in claim 18, wherein the non-zero value in each of the second subset of the set of sub-carriers in the frequency domain gradually decreases as the second subset of the set of sub-carriers are closer to ends of an OFDM channel comprised of the set of sub-carriers.

20. The RF transmitter as recited in claim 17, wherein the difference between the first element of the basis vector having the highest value and the second element of the basis vector having the next highest value is calculated as a subtraction between the first element of the basis vector having the highest value and the second element having the next highest value.

21. The RF transmitter as recited in claim 17, wherein the difference between the first element of the basis vector having the highest value and the second element of the basis vector having the next highest value is calculated as a ratio between the first element of the basis vector having the highest value and the second element having the next highest value.

22. The RF transmitter as recited in claim 17, wherein a determination that the difference between the first element of the basis vector having the highest value and the second element having the next highest value cannot be further improved is made based upon whether the difference satisfies a threshold.

23. The RF transmitter as recited in claim 17, wherein generating the first time domain cancelation vector includes, for each element of the symbol vector that has a power greater than a threshold, multiplying the value of that element of the symbol vector by the vector of an offset of the basis vector to produce a product.

24. The RF transmitter as recited in claim 23, wherein, after all the elements of the symbol vector that have the power greater than the threshold have been multiplied, summing all the products to generate a sum.

25. The RF transmitter as recited in claim 24, wherein the sum is multiplied by a scaling factor between zero and one to generate the first time domain cancelation vector.

26. The RF transmitter as recited in claim 23, wherein the multiplying is performed by cyclically shifting the basis vector to the right to align it appropriately with the modified symbol vector before the multiplications are performed.

27. The RF transmitter as recited in claim 17, wherein thereafter in each of one or more successive iterations, a next instance of the first or second modified symbol vector is produced from the first or second time domain cancelation vector, and a next instance of the time domain cancelation vector is generated from the first or second modified symbol vector.

28. The RF transmitter as recited in claim 27, wherein the one or more successive iterations continue for a specified number of cycles or until a threshold PAPR has been reached.

29. The RF transmitter as recited in claim 28, wherein following PAPR improvement a Cyclic prefix (CP) is added to each of the first or second modified symbol vectors.

30. The RF transmitter as recited in claim 17, wherein the basis vector is prepared during pre-processing and the values for the basis vector are selected in the frequency domain to ensure all values at the frequencies of the set of sub-carriers used to transmit data and pilot signals are not used, then the basis vector is realized by transformation to the time domain.

31. The RF transmitter as recited in claim 30, wherein a maximum value of the basis vector is 1.

32. The RF transmitter as recited in claim 30, wherein the basis vector is real, and peak reduction is applied independently on an I-channel vector and a Q-channel vector.

* * * * *